(12) United States Patent
Farajidana et al.

(10) Patent No.: US 8,989,675 B2
(45) Date of Patent: *Mar. 24, 2015

(54) SCOPE OF CHANNEL QUALITY REPORTING REGION IN A MULTI-CARRIER SYSTEM

(75) Inventors: Amir Farajidana, San Diego, CA (US); Jelena M. Damnjanovic, Del Mar, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 62 days.

This patent is subject to a terminal disclaimer.

(21) Appl. No.: 13/359,054

(22) Filed: Jan. 26, 2012

(65) Prior Publication Data

US 2012/0120838 A1 May 17, 2012

Related U.S. Application Data

(62) Division of application No. 12/603,410, filed on Oct. 21, 2009.

(60) Provisional application No. 61/107,601, filed on Oct. 22, 2008.

(51) Int. Cl.
*H04B 1/00* (2006.01)
*H04L 5/00* (2006.01)
(Continued)

(52) U.S. Cl.
CPC .............. *H04L 5/0091* (2013.01); *H04B 7/024* (2013.01); *H04B 7/0632* (2013.01); *H04L 5/0035* (2013.01); *H04L 5/0007* (2013.01); *H04L 5/0023* (2013.01)
USPC ........................... 455/69; 455/67.11; 370/252

(58) Field of Classification Search
CPC ..... H04L 1/0026; H04L 5/006; H04L 5/0007; H04L 1/0003; H04L 1/0009; H04L 1/0028; H04B 7/0417; H04B 7/0632; H04B 17/0042; H04B 17/0067; H04B 7/0617; H04B 7/0697; H04W 72/085; H04W 24/10; H04W 72/0406; H04W 24/00; H04W 48/08; H04W 24/08; H04W 28/04
USPC ..................... 455/69, 450, 451, 452.2, 67.11; 370/468, 208, 229, 335, 329, 252, 278
See application file for complete search history.

(56) References Cited

U.S. PATENT DOCUMENTS

2005/0128993 A1 6/2005 Yu et al.
2005/0207367 A1 9/2005 Onggosanusi et al.
(Continued)

FOREIGN PATENT DOCUMENTS

CN 101032108 A 9/2007
CN 101606356 A 12/2009
(Continued)

OTHER PUBLICATIONS

International Search Report & Written Opinion—PCT/US2009/061714, International Search Authority—European Patent Office—May 27, 2010.
(Continued)

*Primary Examiner* — Golam Sorowar
(74) *Attorney, Agent, or Firm* — Paul Kuo

(57) ABSTRACT

Systems and methodologies are described that effectuate or facilitate multichannel feedback in multichannel wireless communication environments. In accordance with various aspects set forth herein, systems and/or methods are provided that construct a carrier set, classifies a carrier as belonging to the carrier set, utilizes the carrier as representative of all carriers included in the carrier set to measure a channel quality of the carrier, and transmits a CQI based on the channel quality of the carrier, wherein the broadcast CQI is representative of all carriers included in the carrier set.

16 Claims, 14 Drawing Sheets

(51) Int. Cl.
*H04B 7/02* (2006.01)
*H04B 7/06* (2006.01)

(56) References Cited

U.S. PATENT DOCUMENTS

| | | |
|---|---|---|
| 2005/0281226 A1* | 12/2005 | Lee et al. .................. 370/329 |
| 2006/0023745 A1* | 2/2006 | Koo et al. .................. 370/468 |
| 2006/0172754 A1 | 8/2006 | Shin et al. |
| 2007/0041457 A1 | 2/2007 | Kadous et al. |
| 2007/0066232 A1 | 3/2007 | Black |
| 2007/0263736 A1* | 11/2007 | Yuda et al. .................. 375/260 |
| 2008/0117867 A1 | 5/2008 | Yin et al. |
| 2009/0052405 A1* | 2/2009 | Ko et al. .................. 370/335 |
| 2010/0113078 A1 | 5/2010 | Farajidana et al. |

FOREIGN PATENT DOCUMENTS

| | | |
|---|---|---|
| EP | 1906569 A1 | 4/2008 |
| JP | 2008508833 A | 3/2008 |
| KR | 1020050013626 | 2/2005 |
| KR | 20070031422 A | 3/2007 |
| WO | WO9950981 | 10/1999 |
| WO | 2004004269 | 1/2004 |
| WO | WO2006105308 A2 | 10/2006 |
| WO | WO2008096997 A2 | 8/2008 |
| WO | WO2009058072 A1 | 5/2009 |

OTHER PUBLICATIONS

Taiwan Search Report—TW098135850—TIPO—Sep. 14, 2012.

* cited by examiner

| PUCCH Report Type | Reported | Mode State | PUCCH Reporting Modes | | | | | | | |
|---|---|---|---|---|---|---|---|---|---|---|
| | | | Mode 1-1 (Wideband, single PMI) | | Mode 2-1 (Subband, single PMI) | | Mode 1-0 (Wideband, no PMI) | | Mode 2-0 (Subband, no PMI) | |
| | | | (bits/BP) | | (bits/BP) | | (bits/BP) | | (bits/BP) | |
| 1 | Sub-band CQI | RI = 1 | NA | | (4+L)*C | | NA | | (4+L)*C | |
| | | RI > 1 | NA | | (7+L)*C | | NA | | (4+L)*C | |
| 2 | Wideband CQI/PMI | 2 TX Antennas RI = 1 | 8*C | | | | NA | | NA | |
| | | 4 TX Antennas RI = 1 | 8*C | | 8*C | | NA | | NA | |
| | | 2 TX Antennas RI > 1 | 11*C | | 11*C | | NA | | NA | |
| | | 4 TX Antennas RI > 1 | 11*C | | 11*C | | NA | | NA | |
| 3 | RI | 2-layer spatial multiplexing | 1*C | | 1*C | | 1*C | | 1*C | |
| | | 4-layer spatial multiplexing | 2*C | | 2*C | | 2*C | | 2*C | |
| 4 | Wideband CQI | RI = 1 | NA | | NA | | 4*C | | 4*C | |

FIG. 8

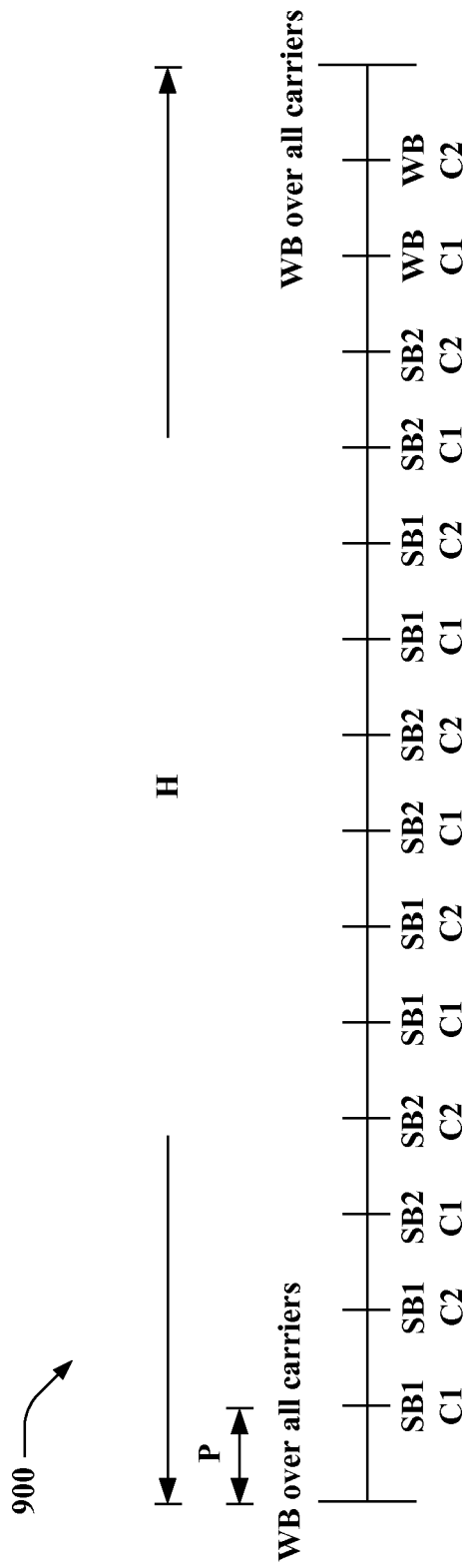

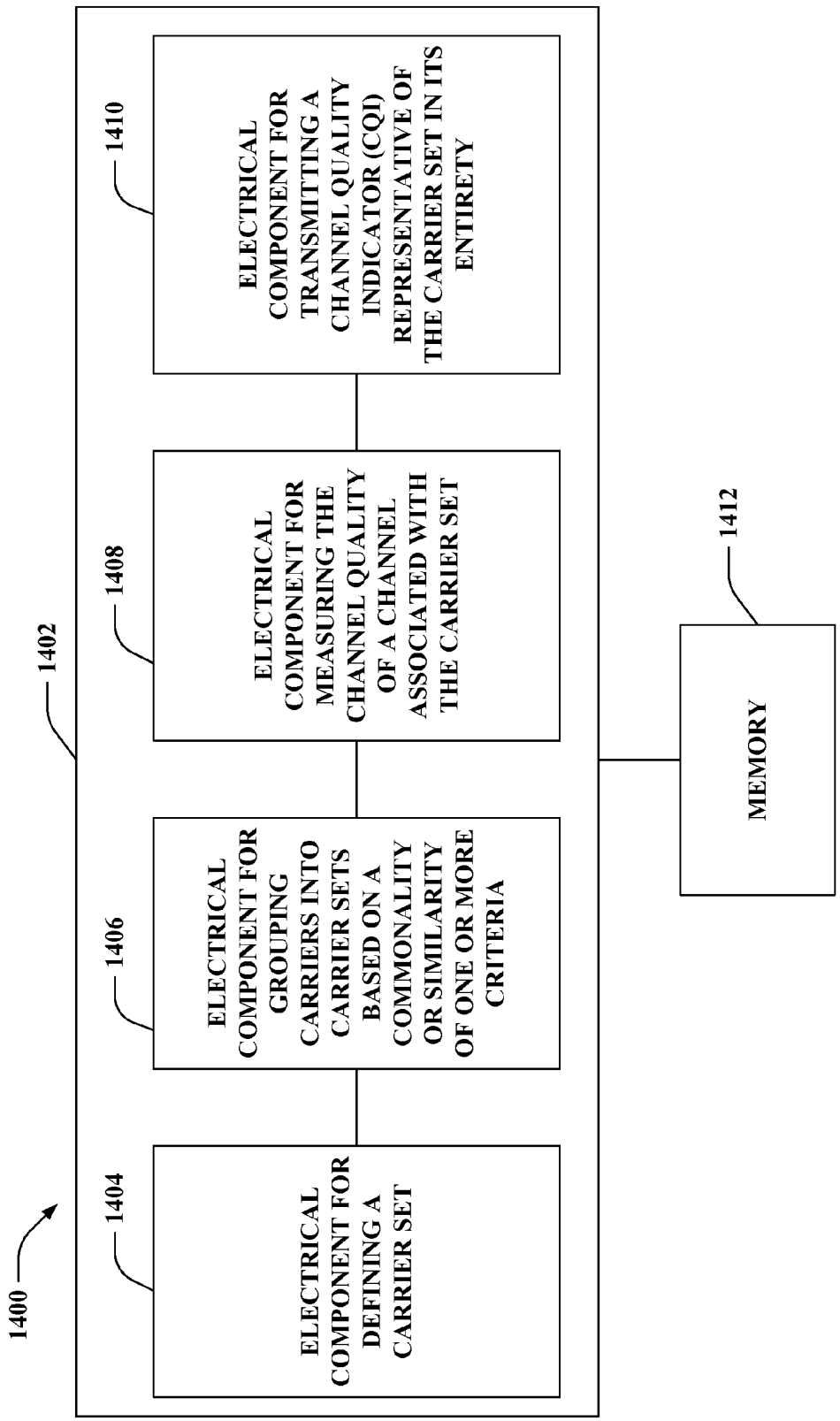

SCOPE OF CHANNEL QUALITY REPORTING REGION IN A MULTI-CARRIER SYSTEM

CROSS-REFERENCES TO RELATED APPLICATIONS

Claim of Priority Under 35 U.S.C. §119

This application is a divisional application of application Ser. No. 12/603,410, filed Oct. 21, 2009, entitled SCOPE OF CHANNEL QUALITY REPORTING REGION IN A MULTI-CARRIER SYSTEM, which claims priority to Provisional Application No. 61/107,601, entitled "CARRIER SET GROUPING FOR USE IN CQI FEEDBACK", filed Oct. 22, 2008, which is assigned to the assignee hereof and hereby expressly incorporated by reference herein.

BACKGROUND

I. Field

The following description relates generally to wireless communications, and more particularly to methods and systems that provide carrier set grouping for use in multichannel feedback.

II. Background

Wireless communication systems are widely deployed to provide various types of communication; for instance, voice and/or data can be provided via such wireless communication systems. A typical wireless communication system, or network, can provide multiple users access to one or more shared resources (e.g., bandwidth, transmit power, . . . ). For instance, a system can use a variety of multiple access techniques such as Frequency Division Multiplexing (FDM), Time Division Multiplexing (TDM), Code Division Multiplexing (CDM), Orthogonal Frequency Division Multiplexing (OFDM), 3GPP Long Term Evolution (LTE) systems, and others.

Generally, wireless multiple-access communication systems can simultaneously support communication for multiple access terminals. Each access terminal can communicate with one or more base stations via transmissions on forward and reverse links. The forward link (or downlink) refers to the communication link from base stations to access terminals, and the reverse link (or uplink) refers to the communication link from access terminals to base stations. This communication link can be established via a single-in-single-out, multiple-in-single-out or a multiple-in-multiple-out (MIMO) system.

MIMO systems commonly employ multiple ($N_T$) transmit antennas and multiple ($N_R$) receive antennas for data transmission. A MIMO channel formed by the $N_T$ transmit and $N_R$ receive antennas can be decomposed into $N_S$ independent channels, which can be referred to as spatial channels, where $N_S \leq \{N_T, N_R\}$. Each of the $N_S$ independent channels corresponds to a dimension. Moreover, MIMO systems can provide improved performance (e.g., increased spectral efficiency, higher throughput and/or greater reliability) if the additional dimensionalities created by the multiple transmit and receive antennas are utilized.

MIMO systems can support various duplexing techniques to divide forward and reverse link communications over a common physical medium. For instance, frequency division duplex (FDD) systems can utilize disparate frequency regions for forward and reverse link communications. Further, in time division duplex (TDD) systems, forward and reverse link communications can employ a common frequency region so that the reciprocity principle allows estimation of the forward link channel from reverse link channel.

Wireless communication systems oftentimes employ one or more base stations that provide a coverage area. A typical base station can transmit multiple data streams for broadcast, multicast and/or unicast services, wherein a data stream may be a stream of data that can be of independent reception interest to an access terminal. An access terminal within the coverage area of such base station can be employed to receive one, more than one, or all the data streams carried by the composite stream. Likewise, an access terminal can transmit data to the base station or another access terminal.

In present wireless communication systems, a channel quality indicator (CQI) can be defined that allows a mobile device or user equipment (UE) to determine a quality of a downlink communication from a transmitting device, such as a base station. A mobile device typically can receive communications over one or more channels. The channels are generally part of a bandwidth distribution scheme where various communication channels are defined for each carrier frequency used in the system. Typically, a mobile device or user equipment will measure the quality of the downlink channel and report this quality to a base station so that the base station can determine whether or not it should alter or adjust various parameters during communication with the mobile device.

Nevertheless, mobile communications systems are currently being contemplated where a mobile device receives communications using multiple carrier frequencies. To date however, there is no mechanism that defines how downlink channel quality measurements should be taken and/or reported to the base station.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

The claimed subject matter relates to the provision of multichannel feedback and more particularly, channel quality indicator (CQI) feedback, for example, among multiple downlink (DL) carriers grouped into sets depending on criteria such as, mobile device or user equipment (UE) transmission (e.g., single input multiple output (SIMO), multiple input multiple output (MIMO), . . . ) where a specific CQI configuration within each set is applied. The notion of the "new" set can be perceived as having a similar meaning to the set S in Release 8 of the 3GPP specifications for Universal Terrestrial Radio Access (UTRA) with the difference that there can be more than a single set defined. Further, each set typically does not span the whole system bandwidth, but generally only the bandwidth of the carriers associated with the set. A special case can, for example, be that each set contains one carrier (e.g., number of sets equals the number of carriers), or that there is one set containing all configured carriers. Tables defining subband size, bandwidth parts, and bandwidth generally can be expanded to cover bandwidths larger than 110 resource blocks (RBs). Moreover, if necessary, the subband size can be increased for larger bandwidths. It should be noted without limitation or loss of generality that the granularity of subband CQI feedback (and to allow for appropriate subband scheduling) can be preserved in a multicarrier system where a carrier set comprises one carrier. The number of sets and which carriers should belong to each set can be semi-statically configured for each mobile device or user equipment by higher layers in the system. It should further be noted at this juncture that while the application in accordance with its various embodiments is elucidated in the context of multichannel feedback as it pertains to CQI feedback, it will nevertheless be appreciated by those of moderate skill in this field of endeavor that multichannel feedback can, without limitation or loss of generality, also include feedback related to other types of feedback such as rank information, precoding information, channel direction information (CDI), or other explicit and/or implicit feedback computed and provided by a mobile device or UE about current channel and/or interference conditions extant on reception of multiple DL carriers.

In accordance with one or more aspects and corresponding disclosure thereof, various aspects are described in connection with effectuating multichannel feedback in multichannel wireless communication environments. In accordance with one aspect, a method is provided for effectuating multichannel feedback wherein the method includes defining a carrier set, grouping a carrier into the carrier set, measuring the channel quality of the carrier, and transmitting a CQI for the carrier set, wherein the CQI can be based in part on the channel quality of the carrier.

In a further aspect, a wireless communications apparatus is disclosed. The wireless communications apparatus can include a memory that retains instructions related to creating a carrier set, categorizing a carrier as belonging to the carrier set, utilizing a subset of carriers included in the carrier set as representative of all carriers included in the carrier set to measure a channel quality of the carrier, and propagating a CQI based on the channel quality of the subset of carriers.

In another aspect, an apparatus that effectuates or facilitates multichannel feedback in a multichannel wireless communication environment is disclosed. The apparatus can include means for defining a carrier set, means for grouping a carrier into the carrier set, means for measuring a channel quality of the carrier, and means for transmitting a CQI for the carrier set where the CQI is based on the channel quality of the carrier.

In accordance with a further aspect, a computer program product is disclosed wherein the computer program product comprises a computer-readable medium that can include code for defining a carrier set, code for grouping a carrier into the carrier set, code for measuring a channel quality of the carrier, and code for transmitting a CQI for the carrier set, wherein the CQI can be based on the channel quality of the carrier.

Additionally, in accordance with a further aspect, a wireless communications apparatus is disclosed. The wireless communications apparatus can include a processor configured to define a carrier set, allocate a carrier to the carrier set, employ the carrier as representative of all carriers included in the carrier set to measure a channel quality of the carrier, and disseminate a CQI based at least in part on the channel quality of the carrier.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments can be employed and the described embodiments are intended to include all such aspects and their equivalents.

BRIEF DESCRIPTION OF THE DRAWINGS

FIG. 8 depicts a further illustrative CQI feedback format designed for multicarrier CQI feedback in accordance with various aspects of the subject disclosure.

FIG. 9 illustrates a further example communications format that can beneficially be utilized by the claimed subject matter to convey CQI feedback from an access terminal to a serving base station in accordance with various aspects of the subject disclosure.

FIG. 14 is an illustration of an example system that enables use of power and phase coherence to multiplex and/or manage interference in the context of flash signals in a wireless communication environment.

DETAILED DESCRIPTION

Figure 1:
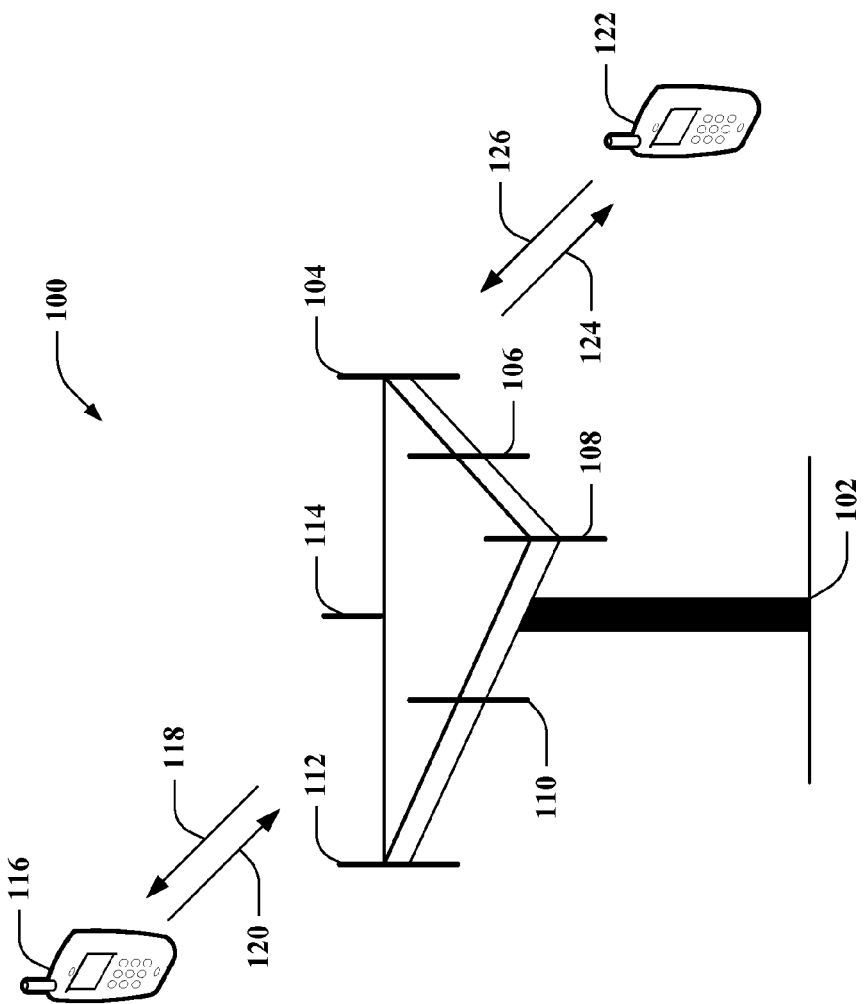
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

The techniques described herein can be used for various wireless communication systems such as code division multiple access (CDMA), time division multiple access (TDMA), frequency division multiple access (FDMA), orthogonal frequency division multiple access (OFDMA), single carrier-frequency division multiple access (SC-FDMA) and other systems. The terms "system" and "network" are often used interchangeably. A CDMA system can implement a radio technology such as Universal Terrestrial Radio Access (UTRA), CDMA2000, etc. UTRA includes Wideband-CDMA (W-CDMA) and other variants of CDMA. CDMA2000 covers IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink.

SC-FDMA utilizes single carrier modulation and frequency domain equalization. SC-FDMA has similar performance and essentially the same overall complexity as those of an OFDMA system. A SC-FDMA signal has lower peak-to-average power ratio (PAPR) because of its inherent single carrier structure. SC-FDMA can be used, for instance, in uplink communications where lower PAPR greatly benefits access terminals in terms of transmit power efficiency. Accordingly, SC-FDMA can be implemented as an uplink multiple access scheme in 3GPP Long Term Evolution (LTE) or Evolved UTRA.

Furthermore, various embodiments are described herein in connection with an access terminal. An access terminal can also be called a system, subscriber unit, subscriber station, mobile station, mobile, remote station, remote terminal, mobile device, user terminal, terminal, wireless communication device, user agent, user device, or user equipment (UE). An access terminal can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with access terminal(s) and can also be referred to as an access point, Node B, Evolved Node B (eNodeB) or some other terminology.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more access terminals such as access terminal 116 and access terminal 122; however, it is to be appreciated that base station 102 can communicate with substantially any number of access terminals similar to access terminals 116 and 122. Access terminals 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, access terminal 116 is in communication with antennas 112 and 114, where antennas 112 and 114 transmit information to access terminal 116 over a forward link 118 and receive information from access terminal 116 over a reverse link 120. Moreover, access terminal 122 is in communication with antennas 104 and 106, where antennas 104 and 106 transmit information to access terminal 122 over a forward link 124 and receive information from access terminal 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to access terminals in a sector of the areas covered by base station 102. In communication over forward links 118 and 124, the transmitting antennas of base station 102 can utilize beamforming to improve signal-to-noise ratio of forward links 118 and 124 for access terminals 116 and 122. Also, while base station 102 utilizes beamforming to transmit to access terminals 116 and 122 scattered randomly through an associated coverage, access terminals in neighboring cells can be subject to less interference as compared to a base station transmitting through a single antenna to all its access terminals.

Figure 2:
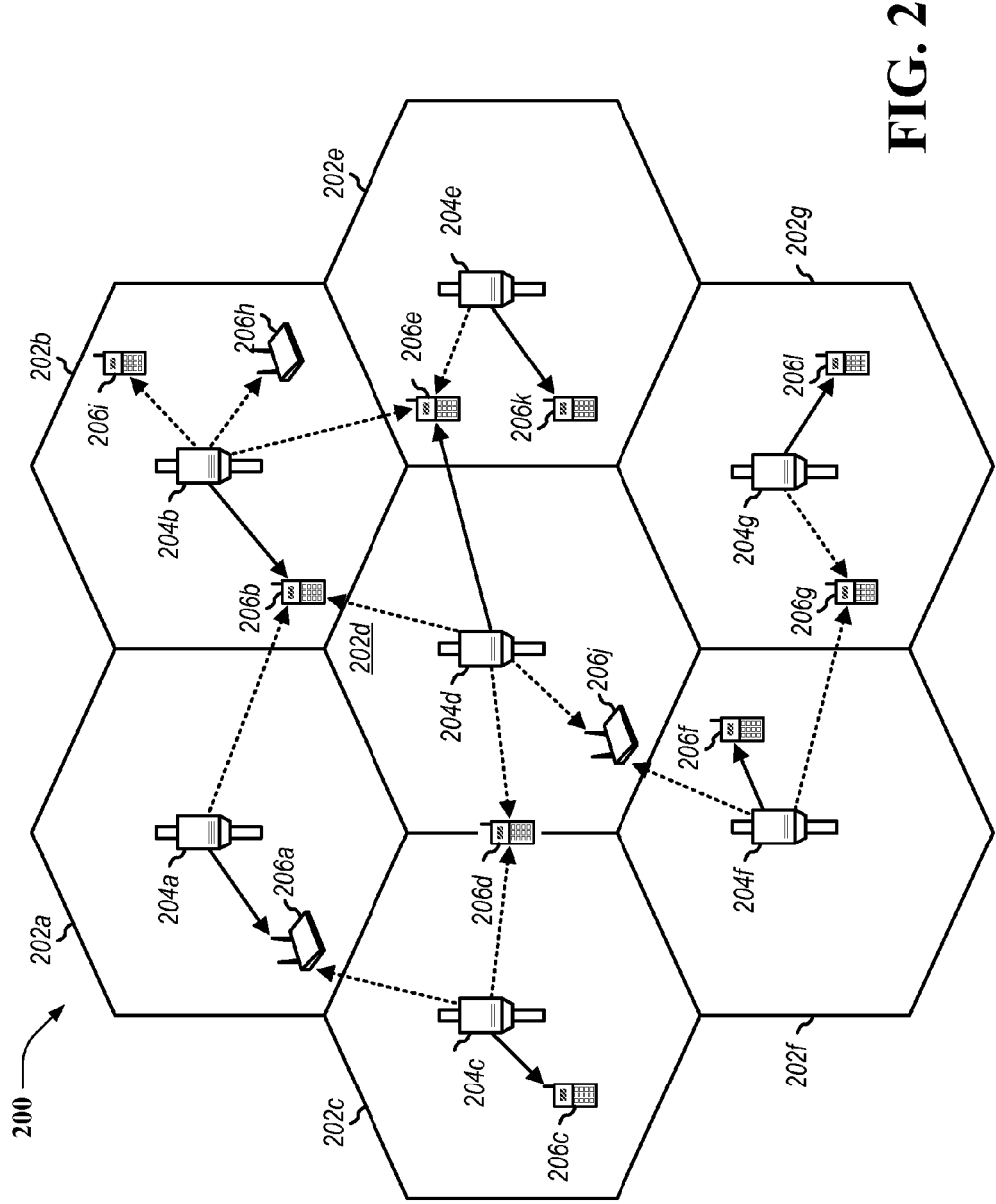
FIG. 2 provides illustration of a further wireless communication system configured to support a number of users, in which various disclosed embodiments and aspects can be implemented.

FIG. 2 provides illustration of a further wireless communication system 200 configured to support a number of users, in which various disclosed embodiments and aspects may be implemented. As shown in FIG. 2, by way of example, system 200 provides communication for multiple cells 202, such as, for example, macro cells 202a-202g, with each cell being serviced by a corresponding access point (AP) 204 (such as APs 204a-204g). Each cell may be further divided into one or more sectors. Various access terminals (ATs) 206, including ATs 206a-206k, also known interchangeably as user equipment (UE) or mobile stations, are dispersed throughout the system. Each AT 206 may communicate with one or more APs 204 on a forward link (FL) and/or a reverse link (RL) at a given moment, depending upon whether the AT is active and whether it is in soft handoff, for example. The wireless communication system 200 may provide service over a large geographic region, for example, macro cells 202a-202g may cover a few blocks in a neighborhood.

As a prelude to a more detailed exposition of the claimed subject matter it is to be appreciated, without limitation of loss of generality, that the subject matter as claimed effectuates and/or facilitates multichannel feedback (e.g., channel quality indicator (CQI), rank indicator (RI), precoding matrix indicator (PMI)) from a multitude of access terminals, mobile devices, or user equipment (UE) to a serving node such as an access point, Node B, or Evolved Node B (eNodeB). As is usual today, the majority of access points, Node Bs, or Evolved Node Bs, in keeping with the concept of backward compatibility, can facilitate and/or effectuate legacy single carrier communications with legacy single carrier mobile devices or user equipment, and as such can receive a single downlink (DL) carrier and correspondingly can transmit a single uplink (UL) carrier in response. Additionally most, if not all, current access points, Node Bs, or Evolved Node Bs can provide support for multicarrier mobile devices, access terminals, or UE wherein multiple DL carriers can be paired with multiple UL carriers such that multicarrier mobile devices, access terminals, or UE can advantageously employ these associations to transmit channel feedback on corresponding paired UL carriers.

Further, communication of multichannel feedback from access terminals, mobile devices, or UE designed for multicarrier operation to a serving node or base station can be actuated and/or facilitated utilizing periodic many-to-one communication wherein commonly broadcast system information (SI) or user equipment specific (e.g., dedicated signaling) radio resource control (RRC) signaling on multiple DL carriers can designate an UL carrier for CQI feedback. Accordingly, a selected UL anchor carrier (e.g., one of many UL anchor carriers received by the serving base station or serving node) can be designated as the carrier, rather than necessarily being paired with a DL carrier, for the purposes of channel feedback.

In order to distinguish between these various designations/mappings for communicating multicarrier feedback for multiple DL carriers from access terminals to serving nodes or serving base stations, a flag can be utilized indicating whether CQI feedback is being conveyed on an UL carrier paired with a DL carrier or on an anchor UL carrier regardless of pairing. Additionally and/or alternatively, designation/mapping as to whether multicarrier feedback is to be communicated via paired uplink UL/DL carriers or is to be interchanged utilizing an anchor UL carrier can be sent via SI or by RRC signaling. It should be noted in this regard that the designation or mapping for CQI feedback for multiple DL carriers can be made transparent to legacy access terminals or user equipment, but multicarrier user equipment or access terminals can nonetheless utilize this flag as an indication for appropriate assignment. In the general case therefore, CQI feedback can be disseminated utilizing any designated UL carrier in accordance with one or more scheduling paradigms dispatched to the access terminal or user equipment via RRC signaling. As will be appreciated, disparate access terminals or user equipment can therefore have different designated UL carriers for their respective CQI feedback. Moreover, where multiple DL carrier CQI feedback is dispatched on one designated UL carrier, the designated UL carrier not only conveys the CQI feedback for the DL carrier to which it is typically paired, but also transports CQI feedback for the other DL carriers. As will also be noted, since there is generally no one-to-one pairing per se between UL/DL carriers for the purpose of conveyance of CQI feedback under this conception, there can be UL carriers that are unfettered from the responsibilities of conveying CQI feedback; therefore if necessary, it is on these unencumbered UL carriers that CQI feedback for legacy access terminals or user equipment can be effectuated.

To provide further illustration of the many-to-one archetype elucidated above, the following example implementations can be employed to convey CQI feedback to the serving node or base station. In accordance with one aspect of the claimed subject matter, each DL carrier can be mapped independently wherein CQI feedback can be configured for each carrier independently, physical uplink control channel (PUCCH) mapping can be planned such that CQI feedback for disparate DL carriers do not overlap, and mapping of CQI feedback can be conveyed to access terminals or user equipment via RRC signaling. Further in a similar manner, legacy access terminals or user equipment can also obtain the information regarding which resource blocks, time offset, and periodicity to map the CQI feedback for each carrier. Thus for instance, distinct CQI feedback per DL carrier can be reported in a concatenated in frequency manner, reported in a cycle in time mode, or can be reported in a staggered in time and/or frequency fashion.

In accordance with a further aspect of the claimed subject matter, and in particular as it pertains to multicarrier channel feedback, rather than independent CQI feedback per DL carrier, multichannel feedback can be reported jointly as one wide bandwidth wherein the table defining the subband size and/or bandwidth parts can be expanded as a function of system bandwidth. Additionally and/or alternatively, rather than conveying CQI multichannel feedback independently or jointly, such information can also be supplied as a single report that defines a CQI format designed to communicate multicarrier CQI feedback or can be conveyed as a cycled carrier/subband report wherein a portion of feedback is reported for each scheduled instance.

In accordance with yet a further aspect, the claimed subject matter can provide multicarrier access terminals or user equipment the capability to perform aperiodic feedback in accordance with a network request or scheduling (e.g., aperiodic feedback grant) provided on multiple DL carriers reported on an UL carrier such as CQI feedback on a PUCCH. Additionally and/or alternatively, CQI feedback can further be effectuated using a data transmission grant for a physical uplink shared channel (PUSCH) responsive to a size and/or message format provided by RRC signaling.

As will be understood by those moderately conversant in this field of endeavor in view of the foregoing therefore, in the most general sense, the claimed matter can group multichannel feedback based at least in part on various network parameters, channel characteristics of different carriers, and/or considerations as to the amount of interference detected or present on each received DL carrier. For instance, carriers can be grouped based on similar path-loss characteristics or based on similar interference levels experienced during the DL phase. Further, transmission modes other than MIMO or SIMO, such as multi-user multiple input multiple output (MU-MIMO) or cooperative multipoint transmission (e.g., where multiple access points, NodeBs, or eNodeBs can cooperate during transmission to sets of UE) can also be a consideration in the grouping for purposes of multichannel feedback. Moreover, grouping of multichannel feedback can also be based on requirements indicated by a serving base station with regard to the accuracy and/or extent of information that needs to be conveyed back to the serving base station with regard to certain DL carriers received at the access terminal or UE. For example, the serving base station can indicate to the access terminal or UE that channel information for selected carriers needs to be provided at higher accuracy levels.

Figure 3:
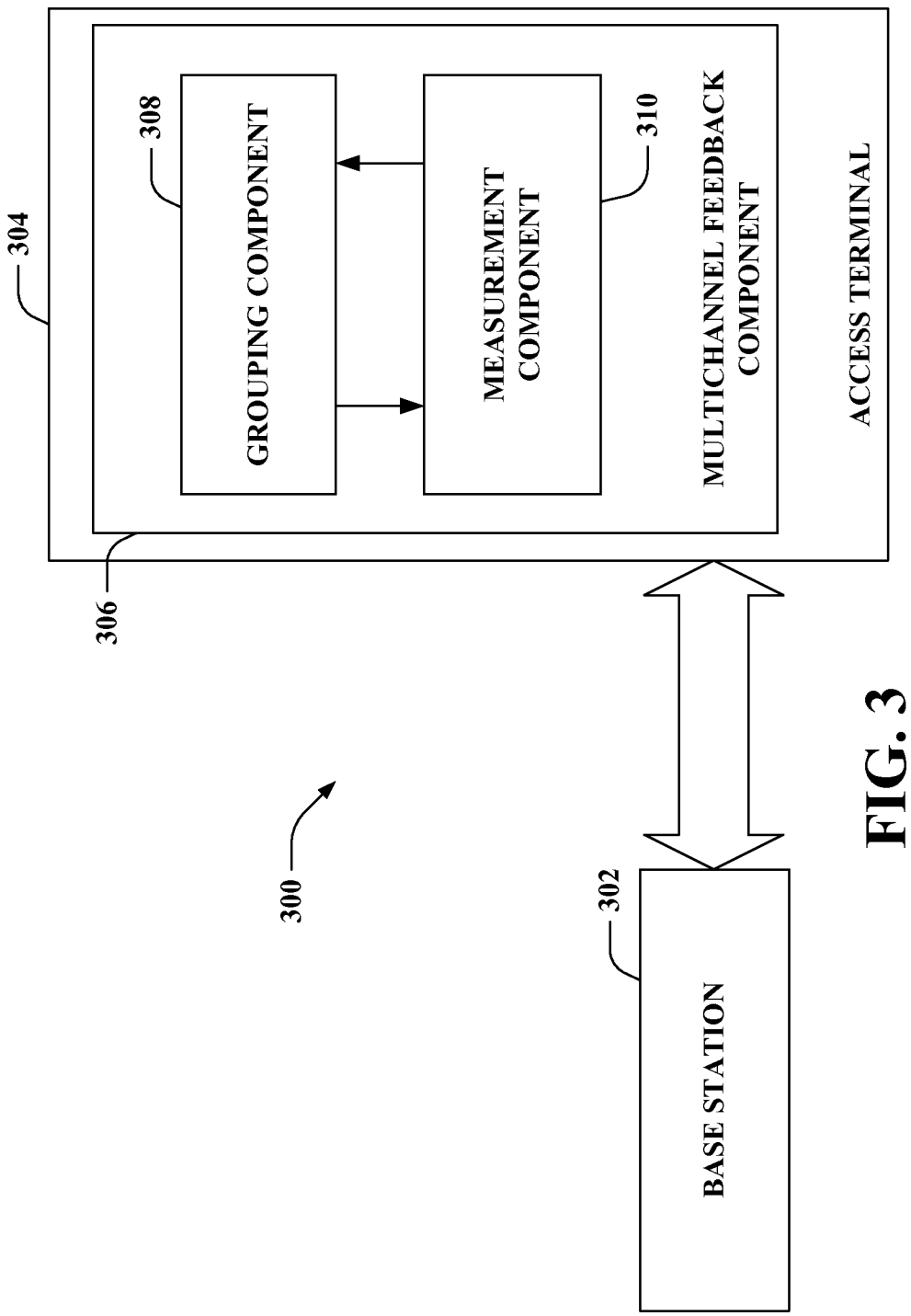
FIG. 3 is an illustration of an example system that effectuates and/or facilitates multichannel feedback between an access terminal and a serving base station in accordance with various aspects of the claimed subject matter.

Turning now to FIG. 3 that illustrates a system 300 that effectuates and/or facilitates multichannel feedback (e.g., CQI, RI, PMI) between a serving base station 302 and an access terminal 304 in accordance with various aspects of the claimed subject matter. As depicted, base station 302 can be in continuous and/or operative or sporadic and/or intermittent communication with access terminal 304 for the purpose of receiving CQI feedback, and in particular for the purpose of acquiring or receiving multicarrier CQI feedback. Since the basic functionality of base station 302 and access terminal 304, respectively, have been elucidated above in connection with FIG. 1 and FIG. 2, a further detailed description of such features has been omitted to avoid needless repetition and for the sake of brevity and conciseness. Nevertheless as depicted, access terminal 304, in this instance, can be a device capable of multicarrier communication with base station 302, and as such can include multichannel feedback component 306. Multichannel feedback component 306 can define distinct and diverse carrier sets, group one or more carriers into the distinct and diverse carrier sets, based at least in part on the ascertained carrier sets, appropriately render CQI feedback across the carriers included in the determined group or set, and thereafter can dispatch or transmit the CQI for the carrier set to base station 302.

In order to actuate and/or effectuate the foregoing therefore, multichannel feedback component 306 can include grouping component 308 that can define and aggregate carriers into different carrier sets or groups based at least in part on various criteria such as whether or not access terminal 304 is effectuating interchange with base station 302 utilizing multiple input multiple output (MIMO) transmissions or single input multiple output (SIMO) transmissions. In this instance, grouping component 308 can detect whether or not intercommunication between base station 302 and access terminal 304 is being conducted using MIMO or SIMO transmissions based at least in part on DL transmissions obtained or received from base station 302. As will be appreciated by those of moderate perspicacity in this field of endeavor, configuration of CQI feedback utilizing MIMO transmissions and SIMO transmissions can be different and distinct and thus can be subject to different configuration requirements and/or constraints.

Further, grouping component 308 can define and/or agglomerate carriers into disparate carrier sets or groups based at least in part on whether or not communication is being effectuated utilizing specific frequency bands or subbands. For instance, grouping component 308 can deduce that CQI feedback for carriers in frequency band A need to be configured in a first manner whereas CQI feedback for carriers in frequency band B should be constituted in a disparate manner. Accordingly, grouping component 308 can define and/or create a grouping for CQI feedback for carriers in a first frequency band (e.g., frequency band A) such that the CQI feedback for those carriers consigned to this first grouping can utilize a common or similar CQI feedback configuration. Grouping component 308 can also define and/or create a grouping for CQI feedback for carriers in a second frequency band (e.g., frequency band B) wherein the CQI feedback for carriers in this alternate grouping can employ a common or similar CQI feedback configuration unique to this second grouping and/or distinct from the CQI feedback configuration of the first grouping.

Additionally and/or alternatively, grouping component 308 can consider a carrier within the group of carriers as comprising a whole frequency band for the purposes of providing CQI feedback for the defined group in its entirety. For example, within a defined group, grouping component 308 can ascertain that there are two carriers utilizing a bandwidth of 5 MHz. Under this circumstance, the two 5 MHz carriers can be grouped and/or aggregated into a single group such that the consequent CQI configuration would correspond to a bandwidth of 10 MHz (e.g., the sum of the carriers included in the group).

The benefits incumbent in utilizing the claimed subject matter and more particularly in grouping or categorizing carriers into groups is that where carriers are employing different transmission modes (e.g., MIMO, SIMO, . . . ) such carriers should be categorized or grouped accordingly. So a carrier employing SIMO transmission should typically be grouped with other carriers utilizing a similar SIMO transmission paradigm. Likewise, a carrier employing a MIMO transmission paradigm should generally be grouped together. The rationale for distinguishing and/or grouping carriers based at least in part on respective transmission modes and/or frequency bands or frequency subbands can be attributable to the fact that since MIMO and SIMO are disparate transmission modes, CQI feedback configuration for each of these transmission modes can entail different criteria; CQI feedback configured for one transmission mode (e.g., MIMO) is not necessarily compatible with CQI feedback configured for a disparate transmission mode (e.g., SIMO).

Multichannel feedback component 306 can additionally include measurement component 310 that can operate individually and/or in concert with grouping component 308 to ascertain CQI feedback for the disparate carriers included in the set as a whole, or for individual carriers included within the carrier set. Since base station 302 needs information about the instantaneous DL channel conditions as received at access terminal 304 for the purpose of channel-dependent scheduling and/or rate control, access terminal 304 through the functionalities and/or facilities provided by measurement component 310 can assess or estimate the instantaneous DL channel conditions. The instantaneous DL channel conditions at an access terminal or UE can typically be based on the signal-to-noise ratio (SNR), signal-to-interference plus noise ratio (SINR), or signal-to-noise plus distortion ratio (SNDR) of a common pilot as received at the user equipment or access terminal (e.g., access terminal 304). Thus, measurement component 310 in conjunction with facilities and/or functionalities provided by grouping component 308 can provide a CQI for dissemination to base station 302.

Figure 4:
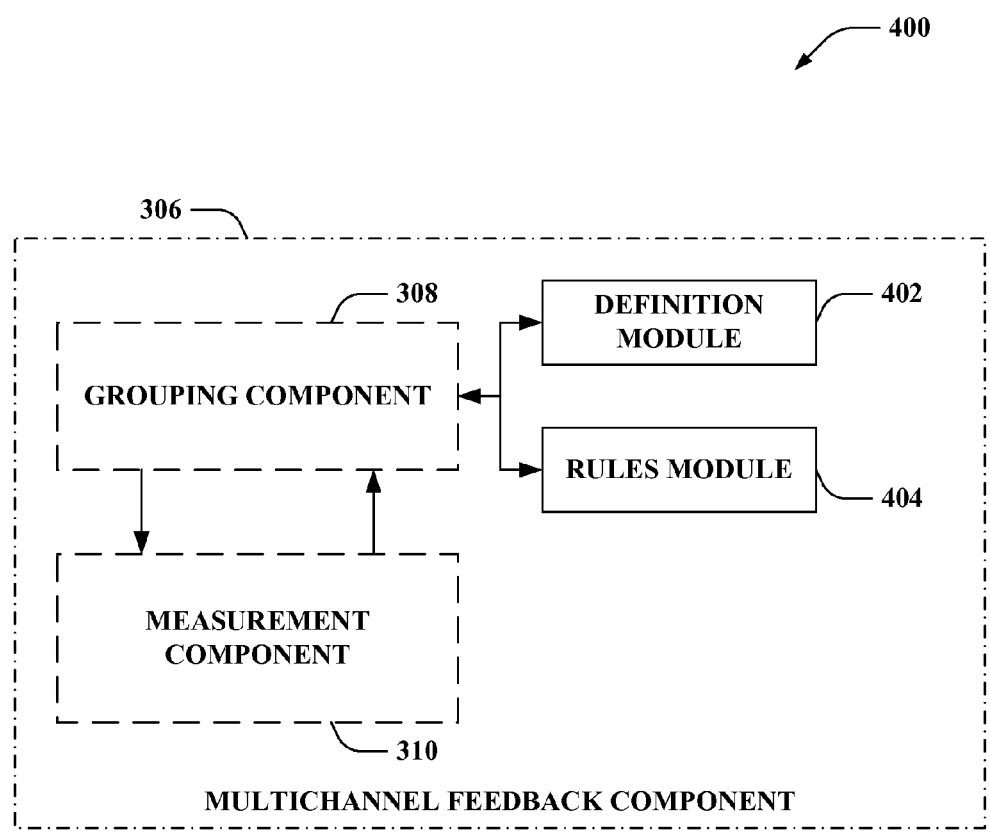
FIG. 4 is an illustration of an example system that effectuates and/or facilitates multichannel feedback between an access terminal and a serving base station in accordance with various aspects of the subject disclosure.

Turning now to FIG. 4 that provides further depiction 400 of multichannel feedback component 306 that includes grouping component 308 and measurement component 310, the functionalities and/or facilities of which have for the most part been elucidated above in connection with FIG. 3. Accordingly, for the sake of brevity and to avoid needless prolixity, further exposition of such features has been omitted. Nevertheless as illustrated, multichannel feedback component 306 can also include definition module 402 and rules module 404 that can be utilized, individually and/or in conjunction, to effectuate and/or facilitate the grouping or categorization of carriers into appropriate carrier sets for the purpose of CQI feedback. Definition module 402 based at least in part on DL transmissions received from a serving base station (e.g., base station 302) can ascertain whether carriers are being transmitted utilizing MIMO or SIMO transmission modes. For example, definition module 402 based at least in part on downlink transmissions received from base station 302 can ascertain whether carriers involved in dynamic interchange between the serving base station (e.g., base station 302) and the access terminal or user equipment (e.g., access terminal 304) are being effectuated utilizing MIMO or SIMO transmission modes. Where definition component 402 ascertains from the received DL transmissions that a MIMO transmission paradigm is being utilized, definition component 402 can create or define a carrier set that includes those carriers employing MIMO as a transmission mode, and further definition module 402 can on detection add to the carrier set other carriers also utilizing MIMO as a transmission mode. Similarly, definition module 402 can also create, define, and/or provision carrier sets directed toward SIMO that include detected carriers employing SIMO as a transmission technology.

Additionally and/or alternatively, definition module 402 can also categorize and/or group carriers into appropriate carrier sets based at least in part on frequency band or frequency subband for the purposes of CQI feedback. Definition module 402, once again based at least in part on DL transmissions received from a serving base station (e.g., base station 302), can determine which frequency band (or frequency subband where a frequency band contains more than one carrier) a particular carrier is using. For example, definition module 402 can ascertain that a first frequency band, frequency band A, is associated with three carriers (e.g., carrier 1, carrier 2, and carrier 3) and as such that CQI feedback for carriers situated in this first frequency band should be configured in a first manner. Further, definition module 402 can also identify from DL transmissions dispatched from a serving base station (e.g., base station 302) that a second frequency band, frequency band B, has included within it two carriers (e.g., carrier 4 and carrier 5). Definition module 402, upon identification that the first frequency band includes three carriers (e.g., carrier 1, carrier 2, and carrier 3) and the second frequency band is associated with two carriers (e.g., carrier 4 and carrier 5), can fractionate and/or group the respective carriers into carrier sets (or carrier subsets) for the purpose of CQI feedback to the serving base station (e.g., base station 302). Thus, definition module 402 can create and/or populate a first carrier set (or first carrier subset) with carriers associated with the first frequency band (e.g., carrier 1, carrier 2, and carrier 3), and similarly definition module 402 can establish a second carrier set (or second carrier subset) and/or include therein carriers associated with the second frequency band (e.g., carrier 4 and carrier 5).

Moreover, definition module 402 can further categorize or group the carriers in the first carrier set (or first carrier subset) and carriers in the second carrier set (or second carrier subset) into further subsets based at least in part on other pertinent parameters and transmission characteristics. For instance, definition module 402 can identify carrier 1 and carrier 2 in the first frequency band, frequency band A, as being MIMO carriers and as such can group or classify these carriers into a group or set designated for MIMO carriers extant in the first frequency band. Similarly, definition module 402 can identify carrier 3 in the first frequency band, frequency band A, as being a SIMO carrier and as such can classify this carrier (e.g., carrier 3) as belonging to a carrier set for SIMO carriers conveyed within the first frequency band, frequency band A. Thus for the purposes of the above illustration, the set of carriers included in the first frequency band (frequency band A) can comprise two sets—a first set for those carriers utilizing MIMO transmissions, and a second set for those carriers employing SIMO transmission schemes. A similar exercise can be performed by definition module 402 in connection with the second frequency band, frequency band B, wherein definition component 402 can ascertain that carrier 4 and carrier 5 situated within the second frequency band, frequency band B, are SIMO carriers and as such can be grouped together into a single carrier set for the purposes of CQI feedback with respect to SIMO carriers extant in the second frequency band.

It should be noted without limitation or loss of generality that definition module 402 does not typically create sets across frequency bands. Thus to continue the on foregoing illustration, definition module 402 on identifying that the first frequency band, frequency band A, comprises three carriers (e.g., carrier 1, carrier 2, and carrier 3) can deduce that at most it might have to create three sets (e.g., one for each carrier included/detected in the first frequency band) or at the very least it might have to create a single monolithic set (e.g., a set that includes all detected carriers within the first frequency band—carrier 1, carrier 2, and carrier 3), but since in this instance there are only three detected carriers associated with the first frequency band, definition module 402 has sufficient cognition to desist from associating the various carriers in disparate other frequency bands (e.g., frequency band B) with sets created for carriers included in the first frequency band, frequency band A.

Once definition module 402 has appropriately grouped the carriers within a particular frequency band into apposite carrier sets, rules module 404 can apply rules (e.g., contemporaneously ascertained, dynamically determined, and/or pre-established rules) to the respective carrier groupings or carrier sets to ensure the appropriate dispersion of CQI feedback to the serving base station (e.g., base station 302). For example, rules module 404 can deduce that since access terminal 304 is capable of multicarrier operations that CQI feedback for respective carrier sets can be conveyed on an UL carrier paired with a DL carrier. Additionally and/or alternatively, rules module 404 can ascertain that dispatch of CQI feedback for a particular carrier set would best be served by conveying it on an anchor UL carrier, wherein the anchor UL carrier is identified or selected without regard to pairing (e.g., UL/DL pairings) and/or the identified or selected anchor UL carrier not only conveys the CQI feedback for the DL carrier for which it would nominally have been paired, but also conveys CQI feedback for other associated carriers included in the carrier set or carrier group.

As a further example, rules module 404 can also apply rules such that the CQI feedback for each carrier included in the set of carriers or group of carriers is conveyed independently so that PUCCH mapping can be planned to ensure that CQI feedback for disparate carriers included in the set of carriers do not overlap. Moreover, information regarding resource block, time offset, and/or periodicity can also be utilized by rules module 404 to map CQI feedback for each carrier. Where factors such as resource block, time offset, and/or periodicity are utilized, distinct CQI feedback per DL carrier can be reported in a concatenated in frequency pattern, reported in a cycle in time manner, and/or reported in a staggered in time and/or frequency fashion.

Additionally and/or alternatively, in particular with respect to multicarrier channel feedback, rather than independent CQI feedback per DL carrier, feedback can be reported jointly as a single wide bandwidth where the table that typically defines the subband size and/or bandwidth parts can be expanded as a function of system bandwidth. Furthermore, as an addition and/or alternative to conveying CQI feedback independently or jointly, feedback can be disseminated as a single report that defines a CQI format designed to communicate multicarrier CQI feedback, or can be conveyed as a cycled carrier/subband report where a portion of feedback is reported for each scheduled instance.

Rules module 404 can also apply rules to effectuate aperiodic feedback consonant with a network request or scheduling (e.g., an aperiodic feedback grant) provided on multiple DL carriers reported on an UL carrier, such as CQI feedback on a PUCCH. Moreover, rules module 404 can further apply rules to effectuate CQI feedback using a data transmission grant for a PUSCH responsive to a size and/or message format provided by RRC signaling.

It should be noted in the context of rules module 404 that since multichannel feedback reporting can typically be dependent on grouping configuration, rules module 404 can apply rules in disparate manners in order to effectuate multichannel feedback. For example, in a system that includes four channels for multichannel feedback, the rules applied for the reporting of multichannel feedback for sets that include two carriers each can be different than the rules applied for the reporting of multichannel feedback for a set that includes all four carriers (e.g., application of rules for the purposes of reporting multichannel feedback can be dependent on the number of carriers included in the set).

Additionally, it should further be noted in connection with rules module 404 that rules module 404 can apply rules that can effectuate new or novel reporting mechanisms where reported feedback information from multiple carrier sets can be multiplexed. For example, where multiple reports from multiple carrier sets are scheduled simultaneously, rules module 404 can select the ordering of the carrier sets that should be dispatched based on a rule mutually agreed upon by the access terminal and the serving base station (e.g., a fixed ordering among carrier sets).

Figure 5:
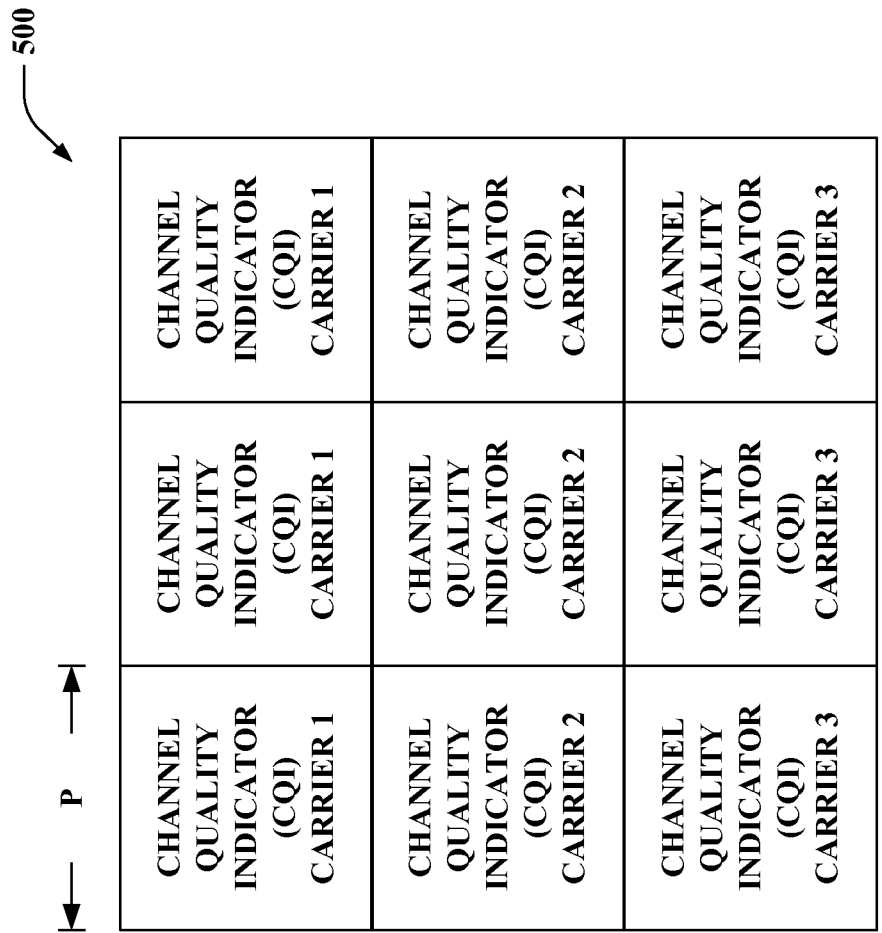
FIG. 5 depicts one example transmission format that can be employed to convey channel quality indictor (CQI) feedback from an access terminal to a serving base station in accordance with one or more aspects of the claimed subject matter.

Turning now to FIG. 5 that depicts one format 500 that can be employed to convey CQI feedback from an access terminal (e.g., access terminal 304) to a serving base station (e.g., base station 302) in accordance with one or more aspects of the claimed subject matter. Conveyance format 500 can be utilized to communicate distinct CQI feedback per download carrier in a concatenated in frequency manner during a time period "P". In this instance, conveyance format 500 communicates CQI feedback for carrier 1, carrier 2, and/or carrier 3 during the same time period "P" wherein the CQI feedback for each respective carrier (e.g., carrier 1, carrier 2, and/or carrier 3) is concatenated for transmission during time period "P".

Figure 6:
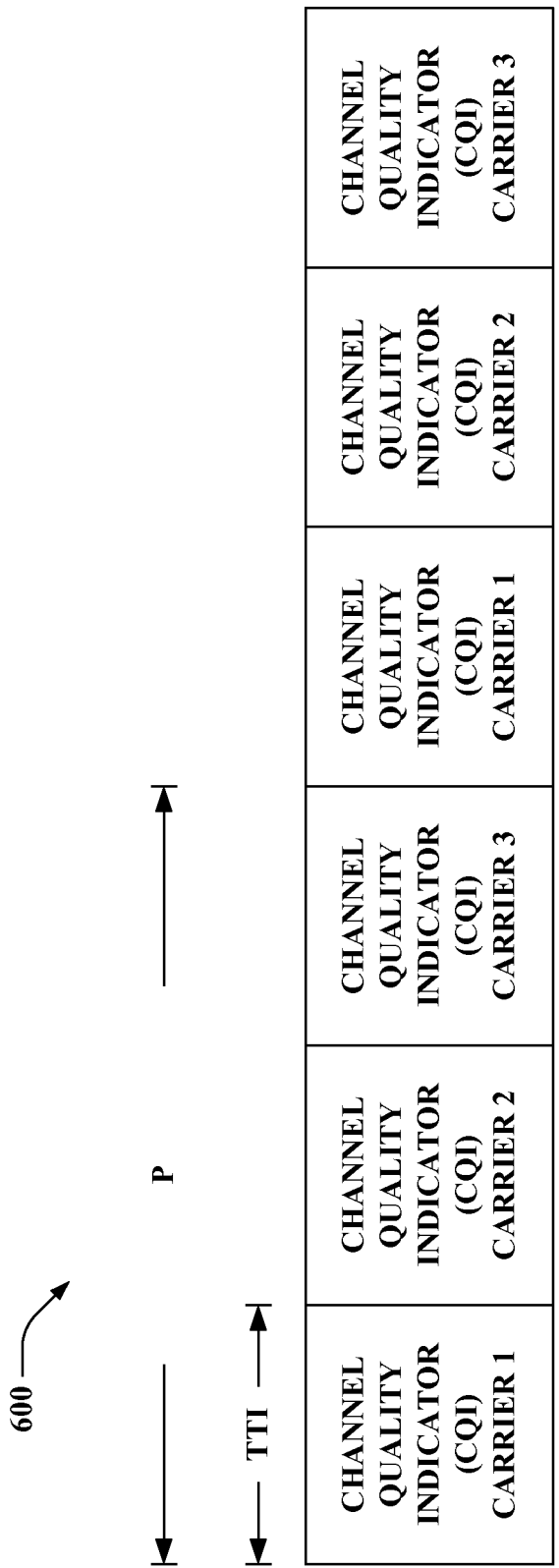
FIG. 6 is an illustration of a further example communication format that can be employed to communicate CQI feedback from an access terminal to a serving base station in accordance with various aspects of the claimed subject matter.

FIG. 6 provides illustration of a further format 600 that can be employed to communicate CQI feedback from an access terminal (e.g., access terminal 304) to a serving base station (e.g., base station 302) in accordance with various aspects of the claimed subject matter. In this instance, transmission format 600 can provide CQI feedback in a cycle in time fashion wherein CQI feedback for each carrier (e.g., carrier 1, carrier 2, and/or carrier 3) can each be accorded a transmit time interval (TTI) within which to transmit their respective CQI feedback. Thus, CQI feedback for carrier 1 can be transmitted for a first duration of time limited by the TTI, CQI feedback for carrier 2 can be transmitted for a second duration of time limited by the TTI, and/or CQI feedback for carrier 3 can subsequently be transmitted for a third duration of time once again limited by the TTI. Possible larger delays and CQI information inaccuracy can be a result and can be implemented with the same overhead as in a single carrier case. Moreover, the same delay can be achieved when feedback for different carriers are time offset with the same periodicity as in the single carrier case but with larger overhead. As will have been apparent to those moderately observant, the claimed subject matter has to this point been explicated as using three carriers, however, it should be noted that the subject matter as claimed is not so limited, as a greater or lesser number of carriers can be utilized without departing from the scope and/or intent of the claimed matter.

Figure 7:
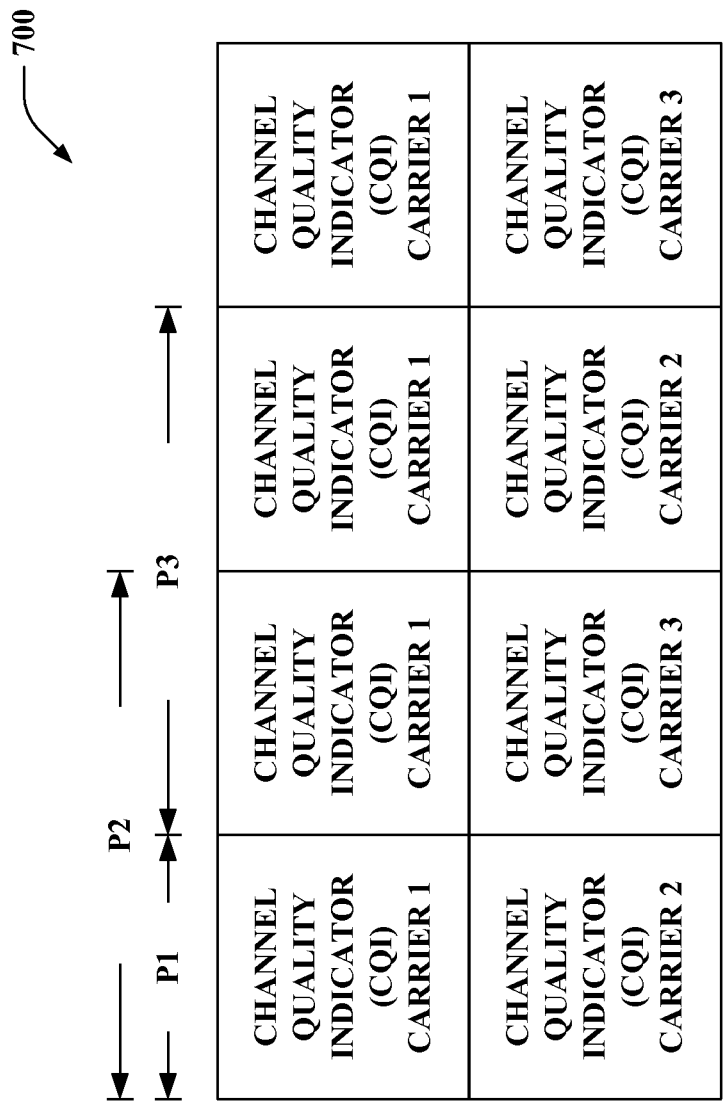
FIG. 7 is an illustration of another example communication format that can be employed to interchange CQI feedback from an access terminal to a serving base station in accordance with further aspects of the claimed subject matter.

FIG. 7 depicts another communication format 700 that can be employed to interchange CQI feedback from an access terminal (e.g., access terminal 304) to a serving base station (e.g., base station 302) in accordance with further aspects of the claimed subject matter. As illustrated in FIG. 7 communication format 700 provides for the communication of CQI feedback in a staggered in time and/or frequency manner. Frequency, periodicity (e.g., P1=1, P2=2, P3=2) and/or offset (e.g., O1=0, O2=0, O3=1) for each DL carrier report can be defined. Concatenating in frequency can be a special case where all CQI feedback reports have the same or a similar periodicity and/or offset. Further, cycling in time can also be special instance where all CQI feedback reports have the same or a similar periodicity but disparate offsets. Flexibility to adjust to the requirements for each carrier can be provided, for example, to cater for CQI reporting delays and/or overhead. Moreover, in the case of wideband CQI feedback over all carriers not explicitly reported, such feedback can nonetheless be implicitly obtained from the wideband reports per carrier. Furthermore, where CQI feedback for disparate carriers is configured on the same resources but with different offset/periodicity, occasional collisions are possible in which case RRC rules can be utilized to ascertain which carrier should take precedence.

FIG. 8 depicts a further illustrative CQI feedback format 800 designed for multicarrier CQI feedback, and more particularly, for utilization in conjunction with the claimed subject matter. CQI feedback format 800 can be a PUCCH format employed for CQI reporting that includes CQI feedback for multiple DL carriers that comprises feedback for all/some DL carriers in one report. Each DL CQI feedback can be configured with a same single mode. CQI feedback instances can be concatenated. Wideband CQI reports can consist of multiple wideband CQI reports, one for each carrier. Subband CQI reports can consist of multiple subband CQI reports, one of each carrier. Explicit carrier information can be needed (e.g., where subsets of carrier CQI reports are desired). Multiple options depending on the number of carriers can be implemented. For instance, configurations can be defined similarly as in the case of subband feedback. In a further instance, options can be network configured (e.g., for aperiodic reporting), UE selected, or wideband mode identified. Joint coding across the concatenated CQI per reporting instance can be utilized. In accordance with an aspect, a larger payload size can be particularly suitable for aperiodic feedback sent on PUSCH. For instance, Modes 1-1 and/or 2-1 defined for periodic PUCCH transmissions can be defined for use in an aperiodic manner on PUSCH for multicarrier operations.

FIG. 9 illustrates a further example communications format 900 that can beneficially be utilized by the claimed subject matter to convey CQI feedback from an access terminal (e.g., access terminal 304) to a serving base station (e.g., base station 302). Communications format 900 can be utilized to report multichannel feedback in a cycled carrier/subband manner wherein a portion of feedback reporting is reported for each scheduled instance. More particularly, communications format 900 can be utilized for PUCCH transmission of feedback and treats each DL carrier in a way that is similar to how subbands are conventionally addressed. For periodic reporting, wideband CQI feedback over all carriers, wideband CQI feedback for each carrier, and subband CQI feedback for each carrier can be sent with a certain periodicity.

Figure 10:
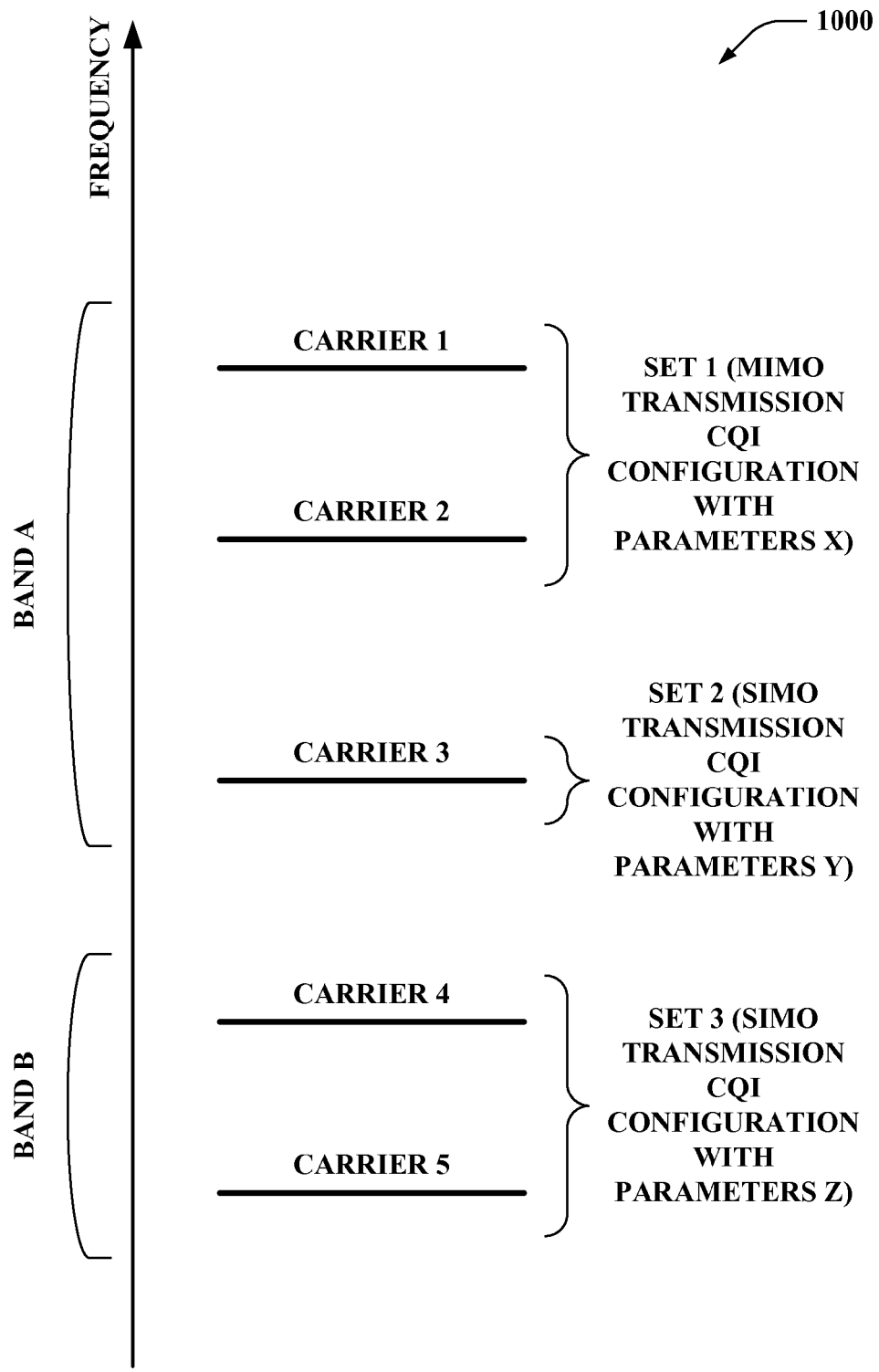
FIG. 10 provides representation of an illustrative grouping scheme that can be employed in conjunction with the claimed subject matter and in accordance with various aspects of the subject disclosure.

FIG. 10 provides representation of an illustrative grouping scheme 1000 that can be employed in conjunction with the claimed subject matter. As illustrated five DL carriers (e.g., carrier 1, carrier 2, carrier 3, carrier 4, and carrier 5) broadcast by a serving base station (e.g., base station 302) at differing frequencies and in disparate frequency bands can have been detected by an access terminal (e.g., access terminal 304). Carriers 1, 2, and 3 can have been broadcast in a first frequency band, frequency band A, and carriers 4 and 5 can have been transmitted in a second frequency band, frequency band B. Moreover, as detected at the access terminal, carriers 1 and 2 in frequency band A can be using a MIMO transmission mode, carrier 3 in frequency band A can be employing a SIMO transmission mode, and carriers 4 and 5 in frequency band B can be utilizing SIMO transmission modes. In accordance with various aspects of the claimed subject matter therefore, and in particular for the purposes of CQI feedback, carriers 1 and 2 in frequency band A can be grouped into a first carrier set, set 1, based at least in part on the similarity of transmission mode (e.g., MIMO transmission mode) and CQI feedback to serving base station for this grouping or carrier set can be configured utilizing a first set of configuration parameters, parameters X. Carrier 3 in frequency band A, being a SIMO transmission carrier can be associated with a second distinct carrier set, set 2, and appropriate configuration parameters, parameters Y, can be applied for CQI feedback for the purposes of carrier 3. In a similar manner, carriers 4 and 5 in frequency band B can be grouped in a third carrier set based at least in part on a similarity of transmission mode (e.g., a SIMO transmission mode) and a commonality of frequency band (e.g., both carriers 4 and 5 are associated with frequency band B), and CQI feedback to the serving base station in response to and for these DL carriers can be configured with a third set of configuration parameters, parameters Z.

Figure 11:
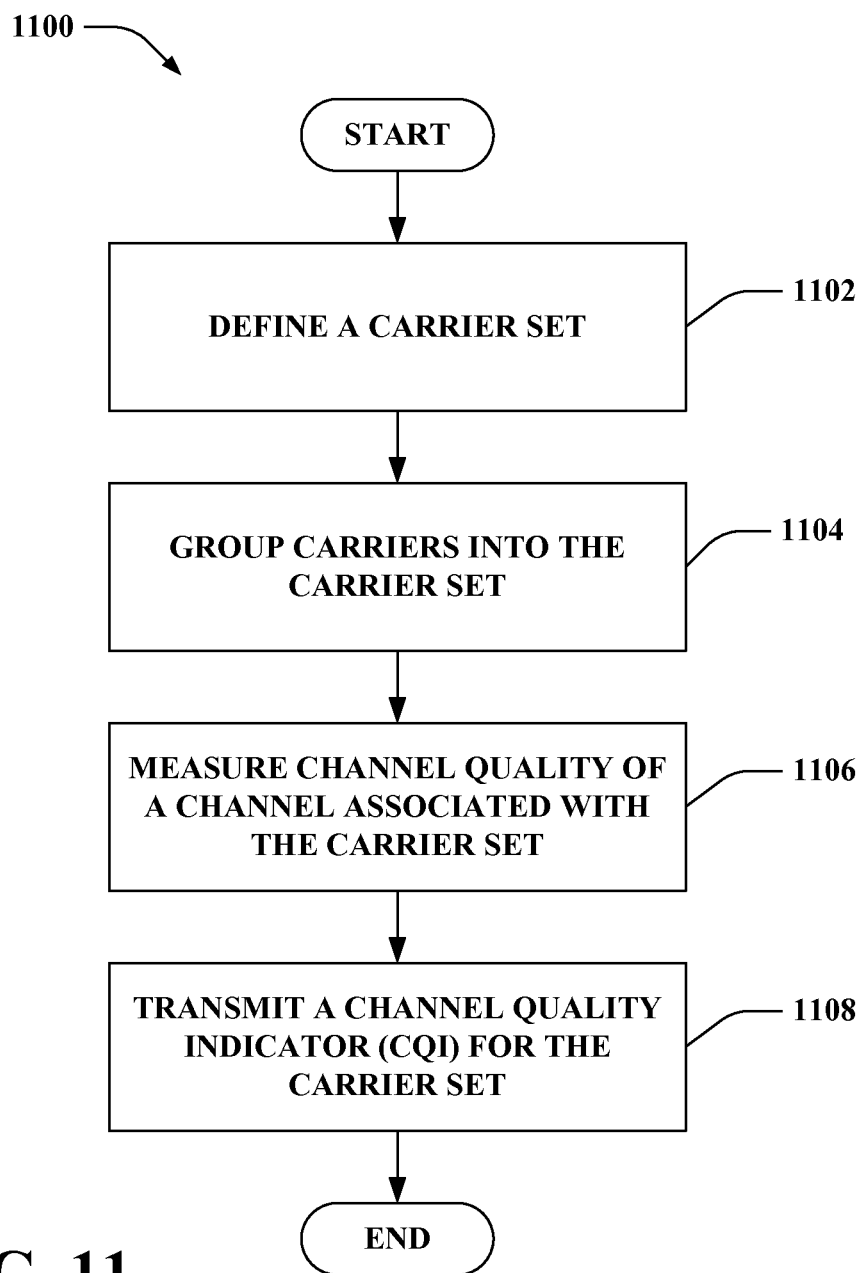
FIG. 11 is an illustration of an example methodology that effectuates and/or facilitates multichannel feedback between an access terminal and a serving base station in accordance with various aspects of the subject disclosure.

Referring to FIG. 11, a methodology relating to grouping CQI feedback from multiple DL carriers into sets is illustrated. While, for purposes of simplicity of explanation, the methodologies are shown and described as a series of acts, it is to be understood and appreciated that the methodologies are not limited by the order of acts, as some acts can, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts can be required to implement a methodology in accordance with one or more embodiments.

With reference to FIG. 11, an illustrative methodology 1100 is presented that groups CQI feedback from multiple DL carriers into sets depending on a number of factors and/or conditions, such as transmission mode (e.g., MIMO transmission, SIMO transmission, etc.) or some other criterion, wherein a specific CQI configuration within the set can be applied. Methodology 1100 can commence at 1102 where a carrier set can be defined based at least in part on one or more factors, such as transmission mode, for example. At 1104 multiple DL carriers can be monitored and/or grouped into the defined carrier sets. The multiple DL carriers can be assigned to disparate carrier sets based at least in part on the transmission mode being employed by the user equipment (e.g., access terminal 304) or the association of the multiple and/or disparate DL carriers into carrier sets can be based on some other criteria. At 1106 measurement of channel quality of at least one of the DL carriers associated or included into the defined carrier set can be made. It is to be appreciated without limitation or loss of generality that the measurement of the channel quality of one of the DL carriers included in the defined carrier set can act as simulacrum or representative measurement for the entirety of the DL carriers bundled, associated, or grouped in the defined carrier set. At 1108 the representative CQI for the carrier set can be dispatched or transmitted to the serving base station (e.g., base station 302). It once again should be kept in mind, without limitation or loss of generality that the CQI feedback disseminated back to the serving base station is based on a representative or randomly selected or identified DL carrier received from the serving base station. The representative or randomly selected or identified DL can be representative of the defined carrier set as a whole. Therefore, there is typically no need to take measurement, for the purpose of CQI feedback, of all DL carriers included in the carrier set; measurement of a representative sample (e.g., at least one) of the DL carriers included in the carrier set can suffice for the purposes of CQI feedback.

It will be appreciated that, in accordance with one or more aspects described herein, inferences can be made regarding use of power and phase coherence to multiplex and/or manage interference in the context of flash signals. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 12:
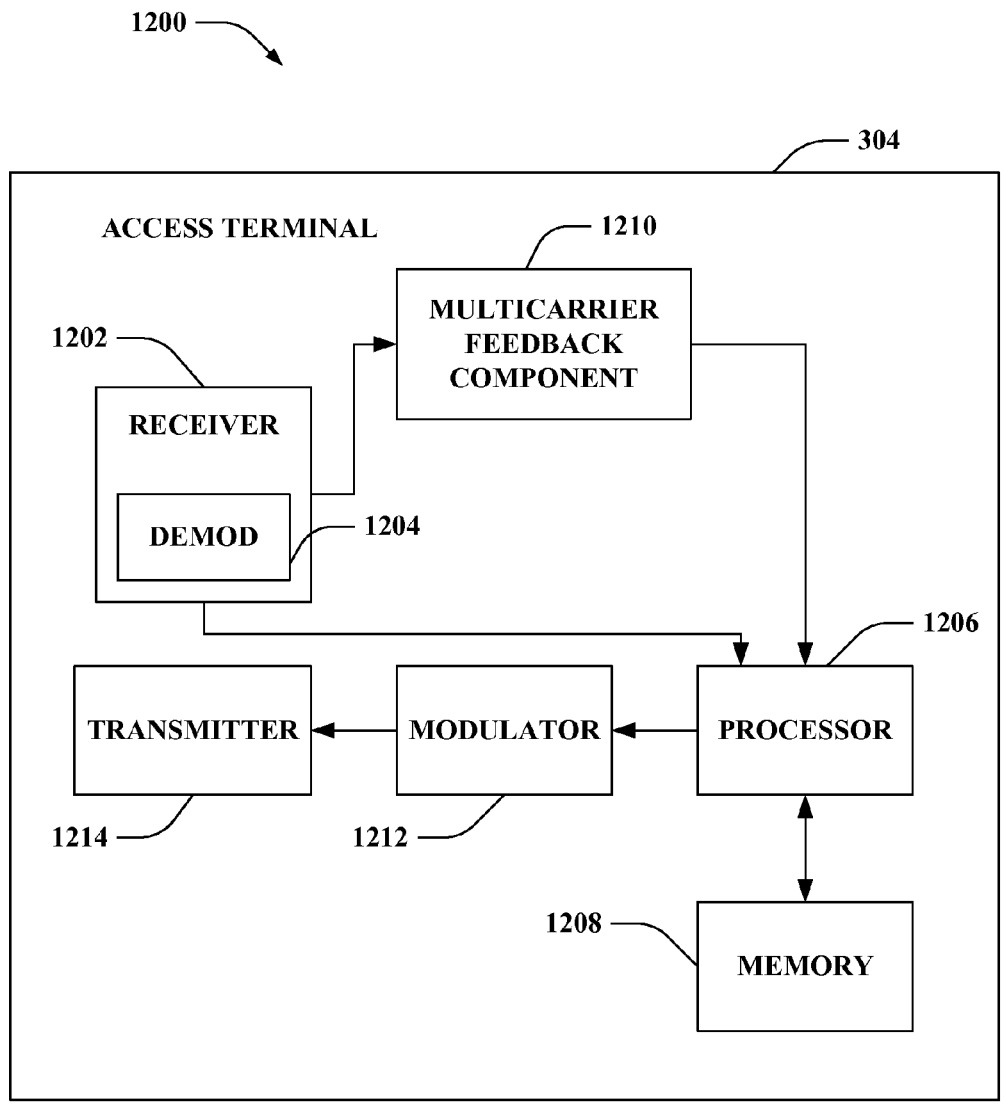
FIG. 12 is an illustration of an example access terminal that effectuates and/or facilitates use of power and phase coherence to multiplex and/or manage interference in the context of flash signals in a wireless communication system.

FIG. 12 is an illustration 1200 of an access terminal 304 that effectuates CQI feedback in a multichannel wireless communication environment. Access terminal 304 comprises a receiver 1202 that receives a signal from, for instance, a receive antenna (not shown), and performs typical actions thereon (e.g., filters, amplifies, downconverts, etc.) the received signal and digitizes the conditioned signal to obtain samples. Receiver 1202 can be, for example, an MMSE receiver, and can comprise a demodulator 1204 that can demodulate received symbols and provide them to a processor 1206 for channel estimation. Processor 1206 can be a processor dedicated to analyzing information received by receiver 1202 and/or generating information for transmission by a transmitter 1214, a processor that controls one or more components of access terminal 304, and/or a processor that both analyzes information received by receiver 1202, generates information for transmission by transmitter 1214, and controls one or more components of access terminal 304.

Access terminal 304 can additionally comprise memory 1208 that is operatively coupled to processor 1206 and that can store data to be transmitted, received data, and any other suitable information related to performing the various actions and functions set forth herein. For instance, memory 1208 can store group-specific signaling constraints employed by one or more base stations. Memory 1208 can additionally store protocols and/or algorithms associated with identifying signaling constraints used for communicating resource block assignments and/or employing such signaling constraints to analyze received assignment messages.

It will be appreciated that the data store (e.g., memory 1208) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 1208 of the subject systems and methods is intended to comprise, without being limited to, these and any other suitable types of memory.

Receiver 1202 is further operatively coupled to a multicarrier feedback component 1210 which can be substantially similar to multicarrier feedback component 306 of FIG. 3. Multicarrier feedback component 1210 can be employed to group CQI feedback from multiple DL carriers into sets depending on a number of factors including transmission mode (e.g., MIMO, SIMO, etc.). Access terminal 304 still further comprises a modulator 1212 and a transmitter 1214 that transmits the signal to, for instance, a base station, another access terminal, etc. Although depicted as being separate from the processor 1206, it is to be appreciated that multicarrier feedback component 1210 and/or modulator 1212 can be part of processor 1206 or a number of processors (not shown).

Figure 13:
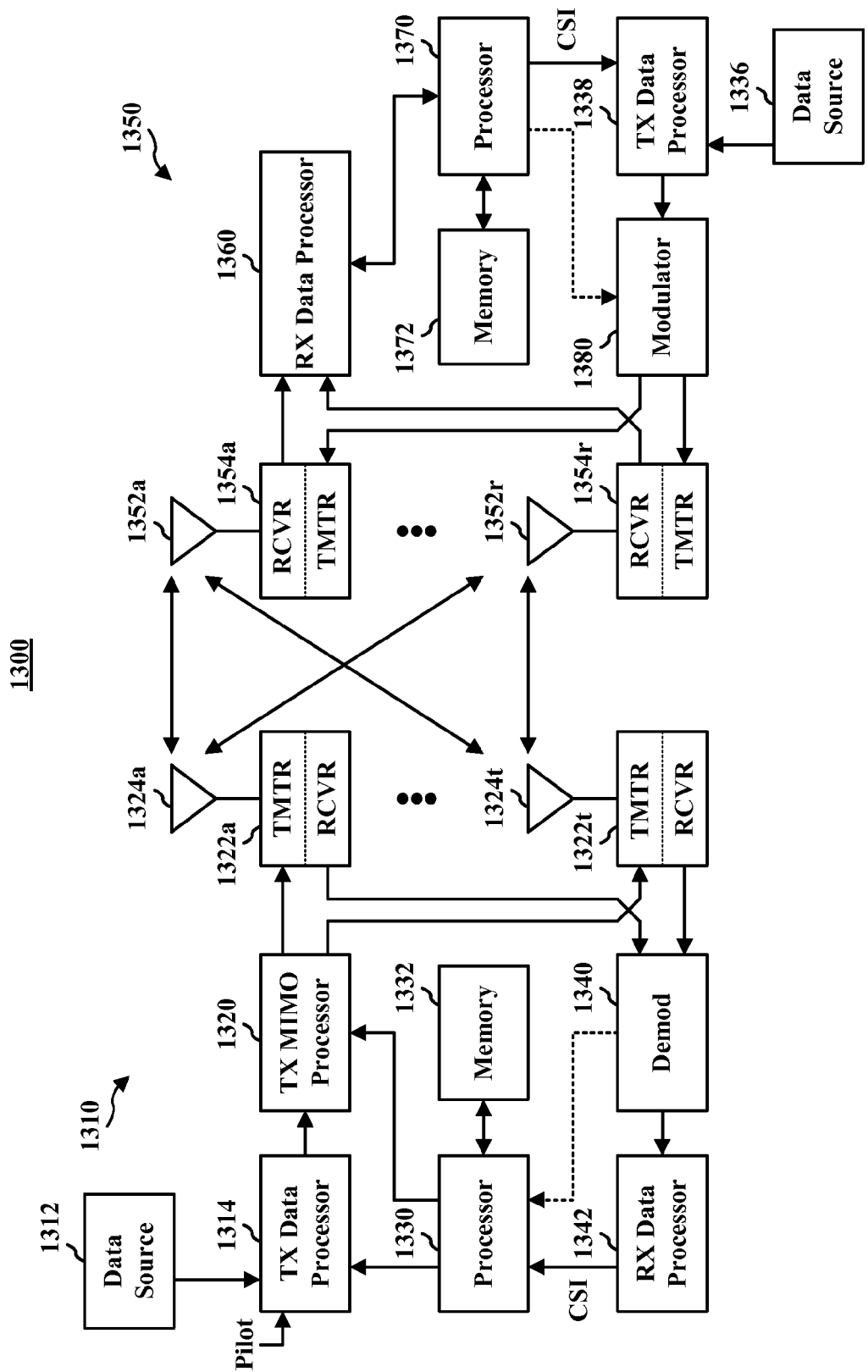
FIG. 13 is an illustration of an example wireless network environment that can be employed in conjunction with the various systems and methods described herein.

FIG. 13 shows an example wireless communication system 1300. The wireless communication system 1300 depicts one base station 1310 and one access terminal 1350 for sake of brevity. However, it is to be appreciated that system 1300 can include more than one base station and/or more than one access terminal, wherein additional base stations and/or access terminals can be substantially similar or different from example base station 1310 and access terminal 1350 described below. In addition, it is to be appreciated that base station 1310 and/or access terminal 1350 can employ the systems (FIGS. 1-4, 12, and 14) and/or method (FIG. 11) described herein to facilitate wireless communication there between.

At base station 1310, traffic data for a number of data streams is provided from a data source 1312 to a transmit (TX) data processor 1314. According to an example, each data stream can be transmitted over a respective antenna. TX data processor 1314 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at access terminal 1350 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1330.

The modulation symbols for the data streams can be provided to a TX MIMO processor 1320, which can further process the modulation symbols (e.g., for OFDM). TX MIMO processor 1320 then provides $N_T$ modulation symbol streams to $N_T$ transmitters (TMTR) 1322a through 1322t. In various embodiments, TX MIMO processor 1320 applies beamforming weights to the symbols of the data streams and to the antenna from which the symbol is being transmitted.

Each transmitter 1322 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 1322a through 1322t are transmitted from $N_T$ antennas 1324a through 1324t, respectively.

At access terminal 1350, the transmitted modulated signals are received by $N_R$ antennas 1352a through 1352r and the received signal from each antenna 1352 is provided to a respective receiver (RCVR) 1354a through 1354r. Each receiver 1354 conditions (e.g., filters, amplifies, and downconverts) a respective signal, digitizes the conditioned signal to provide samples, and further processes the samples to provide a corresponding "received" symbol stream.

An RX data processor 1360 can receive and process the $N_R$ received symbol streams from $N_R$ receivers 1354 based on a particular receiver processing technique to provide $N_T$ "detected" symbol streams. RX data processor 1360 can demodulate, deinterleave, and decode each detected symbol stream to recover the traffic data for the data stream. The processing by RX data processor 1360 is complementary to that performed by TX MIMO processor 1320 and TX data processor 1314 at base station 1310.

A processor 1370 can periodically determine which available technology to utilize as discussed above. Further, processor 1370 can formulate a reverse link message comprising a matrix index portion and a rank value portion.

The reverse link message can comprise various types of information regarding the communication link and/or the received data stream. The reverse link message can be processed by a TX data processor 1338, which also receives traffic data for a number of data streams from a data source 1336, modulated by a modulator 1380, conditioned by transmitters 1354a through 1354r, and transmitted back to base station 1310.

At base station 1310, the modulated signals from access terminal 1350 are received by antennas 1324, conditioned by receivers 1322, demodulated by a demodulator 1340, and processed by a RX data processor 1342 to extract the reverse link message transmitted by access terminal 1350. Further, processor 1330 can process the extracted message to determine which precoding matrix to use for determining the beamforming weights.

Processors 1330 and 1370 can direct (e.g., control, coordinate, manage, etc.) operation at base station 1310 and access terminal 1350, respectively. Respective processors 1330 and 1370 can be associated with memory 1332 and 1372 that store program codes and data. Processors 1330 and 1370 can also perform computations to derive frequency and impulse response estimates for the uplink and downlink, respectively.

In an aspect, logical channels are classified into Control Channels and Traffic Channels. Logical Control Channels can include a Broadcast Control Channel (BCCH), which is a DL channel for broadcasting system control information. Further, Logical Control Channels can include a Paging Control Channel (PCCH), which is a DL channel that transfers paging information. Moreover, the Logical Control Channels can comprise a Multicast Control Channel (MCCH), which is a Point-to-multipoint DL channel used for transmitting Multimedia Broadcast and Multicast Service (MBMS) scheduling and control information for one or several MTCHs. Generally, after establishing a Radio Resource Control (RRC) connection, this channel is only used by UEs that receive MBMS (e.g., old MCCH+MSCH). Additionally, the Logical Control Channels can include a Dedicated Control Channel (DCCH), which is a Point-to-point bi-directional channel that transmits dedicated control information and can be used by UEs having a RRC connection. In an aspect, the Logical Traffic Channels can comprise a Dedicated Traffic Channel (DTCH), which is a Point-to-point bi-directional channel dedicated to one UE for the transfer of user information. Also, the Logical Traffic Channels can include a Multicast Traffic Channel (MTCH) for Point-to-multipoint DL channel for transmitting traffic data.

In an aspect, Transport Channels are classified into DL and UL. DL Transport Channels comprise a Broadcast Channel (BCH), a Downlink Shared Data Channel (DL-SDCH) and a Paging Channel (PCH). The PCH can support UE power saving (e.g., Discontinuous Reception (DRX) cycle can be indicated by the network to the UE, . . . ) by being broadcasted over an entire cell and being mapped to Physical layer (PHY) resources that can be used for other control/traffic channels. The UL Transport Channels can comprise a Random Access Channel (RACH), a Request Channel (REQCH), an Uplink Shared Data Channel (UL-SDCH) and a plurality of PHY channels.

The PHY channels can include a set of DL channels and UL channels. For example, the DL PHY channels can include: Common Pilot Channel (CPICH); Synchronization Channel (SCH); Common Control Channel (CCCH); Shared DL Control Channel (SDCCH); Multicast Control Channel (MCCH); Shared UL Assignment Channel (SUACH); Acknowledgement Channel (ACKCH); DL Physical Shared Data Channel (DL-PSDCH); UL Power Control Channel (UPCCH); Paging Indicator Channel (PICH); and/or Load Indicator Channel (LICH). By way of further illustration, the UL PHY Channels can include: Physical Random Access Channel (PRACH); Channel Quality Indicator Channel (CQICH); Acknowledgement Channel (ACKCH); Antenna Subset Indicator Channel (ASICH); Shared Request Channel (SREQCH); UL Physical Shared Data Channel (UL-PSDCH); and/or Broadband Pilot Channel (BPICH).

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Turning to FIG. 14, illustrated is a system 1400 that facilitates and/or effectuates multichannel feedback in a multichannel wireless communication environment. System 1400 can reside within an access terminal, for instance. As depicted, system 1400 includes functional blocks that can represent functions implemented by a processor, software, or combination thereof (e.g., firmware). System 1400 includes a logical grouping 1402 of electrical components that can act in conjunction. Logical grouping 1402 can include an electrical component for defining a carrier set 1404. Further, logical grouping 1402 can include an electrical component for grouping carriers into carrier sets based on a commonality or similarity of one or more criteria 1406. Moreover, logical grouping 1402 can include an electrical component for measuring the channel quality of a channel associated with the carrier set 1408. Moreover, logical grouping 1402 can include an electrical component for transmitting a CQI representative of the carrier set in its entirety 1410. Additionally, system 1400 can include a memory 1412 that retains instructions for executing functions associated with electrical components 1404, 1406, 1408, and 1410. While shown as being external to memory 1412, it is to be understood that electrical components 1404, 1406, 1408, and 1410 can exist within memory 1412.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A wireless communications apparatus, comprising:
a memory that retains instructions related to creating a carrier set defined by a transmission scheme or a frequency band within which a subset of carriers was received at an access terminal, categorizing a carrier as belonging to the carrier set, utilizing the subset of carriers included in the carrier set as representative of all carriers included in the carrier set to measure a channel quality of the subset of carriers, and propagating a channel quality indicator (CQI) based on the channel quality of the subset of carriers; and
a processor, coupled to the memory, configured to execute the instructions retained in the memory.

2. The wireless communications apparatus of claim 1, wherein the memory further retains instructions related to ascertaining whether transmission of the subset of carriers was effectuated utilizing a multiple input multiple output (MIMO) transmission scheme or a single input multiple output (SIMO) transmission scheme.

3. The wireless communications apparatus of claim 1, wherein the memory further retains instructions related to ascertaining the frequency band within which the subset of carriers was broadcast by a serving base station.

4. The wireless communications apparatus of claim 1, wherein the memory further retains instructions related to categorizing the subset of carriers based on the transmission scheme or the frequency band within which the subset of carriers was dispatched from a serving base station.

5. The wireless communications apparatus of claim 1, wherein the memory further retains instructions related to determining the channel quality of the subset of carriers on receipt of at least one carrier included in the subset of carriers at the access terminal.

6. A method of communicating wirelessly, comprising:
creating a carrier set defined by a transmission scheme or a frequency band within which a subset of carriers was received at an access terminal;
categorizing a carrier as belonging to the carrier set;
utilizing the subset of carriers included in the carrier set as representative of all carriers included in the carrier set to measure a channel quality of the subset of carriers, and
propagating a channel quality indicator (CQI) based on the channel quality of the subset of carriers.

7. The method of claim 6, further comprising ascertaining whether transmission of the subset of carriers was effectuated utilizing a multiple input multiple output (MIMO) transmission scheme or a single input multiple output (SIMO) transmission scheme.

8. The method of claim 6, further comprising ascertaining the frequency band within which the subset of carriers was broadcast by a serving base station.

9. The method of claim 6, further comprising categorizing the subset of carriers based on the transmission scheme or the frequency band within which the subset of carriers was dispatched from a serving base station.

10. The method of claim 6, further comprising determining the channel quality of the subset of carriers on receipt of at least one carrier included in the subset of carriers-at the access terminal.

11. An apparatus for communicating wirelessly, comprising:
means for creating a carrier set defined by a transmission scheme or a frequency band within which a subset of carriers was received at an access terminal;
means for categorizing a carrier as belonging to the carrier set;
means for utilizing the subset of carriers included in the carrier set as representative of all carriers included in the carrier set to measure a channel quality of the subset of carriers, and
means for propagating a channel quality indicator (CQI) based on the channel quality of the subset of carriers.

12. The apparatus of claim 11, further comprising means for ascertaining whether transmission of the subset of carriers was effectuated utilizing a multiple input multiple output (MIMO) transmission scheme or a single input multiple output (SIMO) transmission scheme.

13. The apparatus of claim 11, further comprising means for ascertaining the frequency band within which the subset of carriers was broadcast by a serving base station.

14. The apparatus of claim 11, further comprising means for categorizing the subset of carriers based on the transmission scheme or the frequency band within which the subset of carriers was dispatched from a serving base station.

15. The apparatus of claim 11, further comprising means for determining the channel quality of the subset of carriers on receipt of at least one carrier included in the subset of carriers at the access terminal.

16. A computer program product, comprising:
a non-transitory computer-readable medium comprising:
code for causing a processor to create a carrier set defined by a transmission scheme or a frequency band within which a subset of carriers were received at an access terminal;
code for causing the processor to categorize a carrier as belonging to the carrier set;
code for causing the processor to utilize the subset of carriers included in the carrier set as representative of all carriers included in the carrier set to measure a channel quality of the subset of carriers, and
code for causing the processor to propagate a channel quality indicator (CQI) based on the channel quality of the carrier.

* * * * *